(12) United States Patent
Gershfeld et al.

(10) Patent No.: US 9,060,589 B1
(45) Date of Patent: Jun. 23, 2015

(54) PARACHUTE CARRYING DEVICE

(71) Applicants: David Gershfeld, San Diego, CA (US); Ilham P. Budihartono, Sherman Oaks, CA (US)

(72) Inventors: David Gershfeld, San Diego, CA (US); Ilham P. Budihartono, Sherman Oaks, CA (US)

( * ) Notice: Subject to any disclaimer, the term of this patent is extended or adjusted under 35 U.S.C. 154(b) by 0 days.

(21) Appl. No.: 14/216,712

(22) Filed: Mar. 17, 2014

(51) Int. Cl.
*A45F 3/04* (2006.01)
*B64D 17/00* (2006.01)
*B64D 17/40* (2006.01)
*A45F 3/06* (2006.01)
*B64D 17/30* (2006.01)
*B64D 17/50* (2006.01)
*B64D 17/32* (2006.01)

(52) U.S. Cl.
CPC . *A45F 3/04* (2013.01); *B64D 17/00* (2013.01); *B64D 17/40* (2013.01); *A45F 3/06* (2013.01); *B64D 17/30* (2013.01); *B64D 17/50* (2013.01); *B64D 17/32* (2013.01)

(58) Field of Classification Search
None
See application file for complete search history.

(56) References Cited

U.S. PATENT DOCUMENTS

| | | | | |
|---|---|---|---|---|
| 1,712,307 | A * | 5/1929 | McClintock | 244/148 |
| 1,930,942 | A * | 10/1933 | Pringle | 5/419 |
| 2,508,754 | A * | 5/1950 | Frieder et al. | 244/148 |
| 3,262,660 | A * | 7/1966 | Morrell et al. | 244/148 |
| 3,908,937 | A * | 9/1975 | Poynter | 244/148 |
| 4,793,575 | A * | 12/1988 | Butler | 244/148 |
| 5,785,219 | A * | 7/1998 | Kraft | 224/576 |
| 6,360,927 | B1 * | 3/2002 | Barker | 223/37 |
| 7,090,169 | B2 | 8/2006 | Swanson | |
| 2003/0146348 | A1 * | 8/2003 | Douglas et al. | 244/151 R |
| 2011/0168846 | A1 * | 7/2011 | Strong | 244/148 |

* cited by examiner

*Primary Examiner* — Brian D Nash
(74) *Attorney, Agent, or Firm* — Vladi Khiterer

(57) ABSTRACT

A parachute carrying device comprising a folding mat and a cover connected through a flexible strip, as well as cut outs for pulling out shoulder harnesses, allows to both pack a parachute and carry it securely while traveling.

9 Claims, 3 Drawing Sheets

PARACHUTE CARRYING DEVICE

FIELD OF THE INVENTION

The present invention pertains to a parachute carrying device that allows to both pack the parachute and carry it securely while traveling.

BACKGROUND OF THE INVENTION

A skydiver's life and survival depend on correctly packing a parachute and keeping the packed parachute secure until it is deployed. One of the rules that must be strictly followed when packing a parachute is aligning the risers, i.e. the lines that attach the parachute canopy to the harness/container attached to the body of the skydiver. This is done by way of a folding mat that allows aligning the risers and securing them together. After packing is done, the folding mat is removed. However, carrying a folding mat while traveling is inconvenient. Further, traveling with a packed parachute in its own container leaves expensive parachute equipment vulnerable to snags and other hazards, including the emergency handles being accidently pulled during airport security inspections. What is needed is a parachute carrying device that allows to both pack the parachute and carry it securely while traveling.

SUMMARY OF THE INVENTION

The present invention satisfies this need. It comprises a folding mat and a cover connected by a flexible strip, as well as cut outs for the parachute shoulder harnesses. This allows enclosing the packed parachute inside a parachute container between the folding mat and the cover, pulling the parachute shoulder harnesses out through the cutouts and placing the parachute carrying device over a user's shoulders for carriage.

BRIEF DESCRIPTION OF THE DRAWING FIGURES

DETAILED DESCRIPTION OF THE PREFERRED EMBODIMENT

Figure 1:
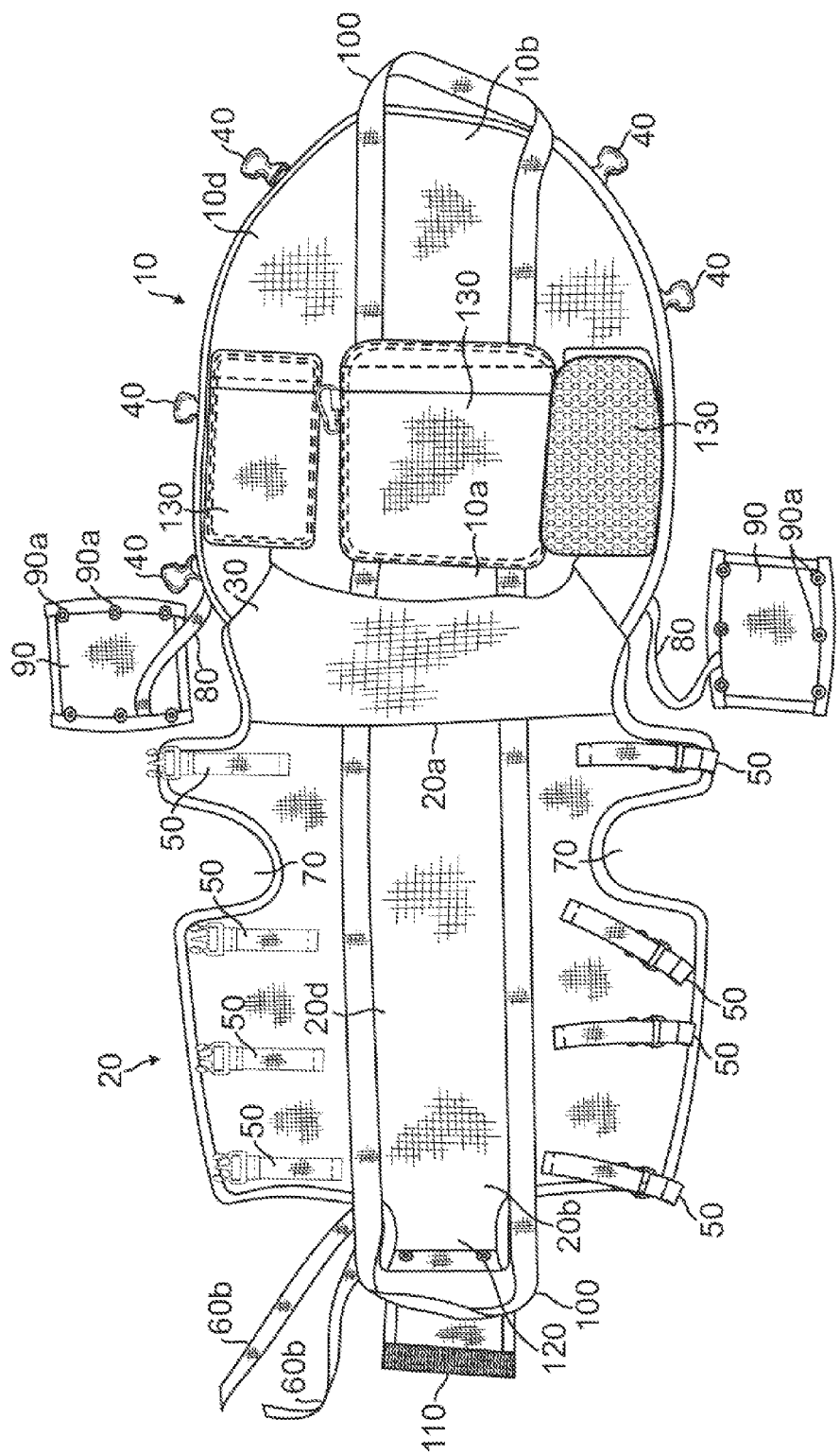
FIG. 1 shows a plan view of a parachute carrying device according to the preferred embodiment of this invention in an open position with an outer side and a back side facing up.
Figure 2:
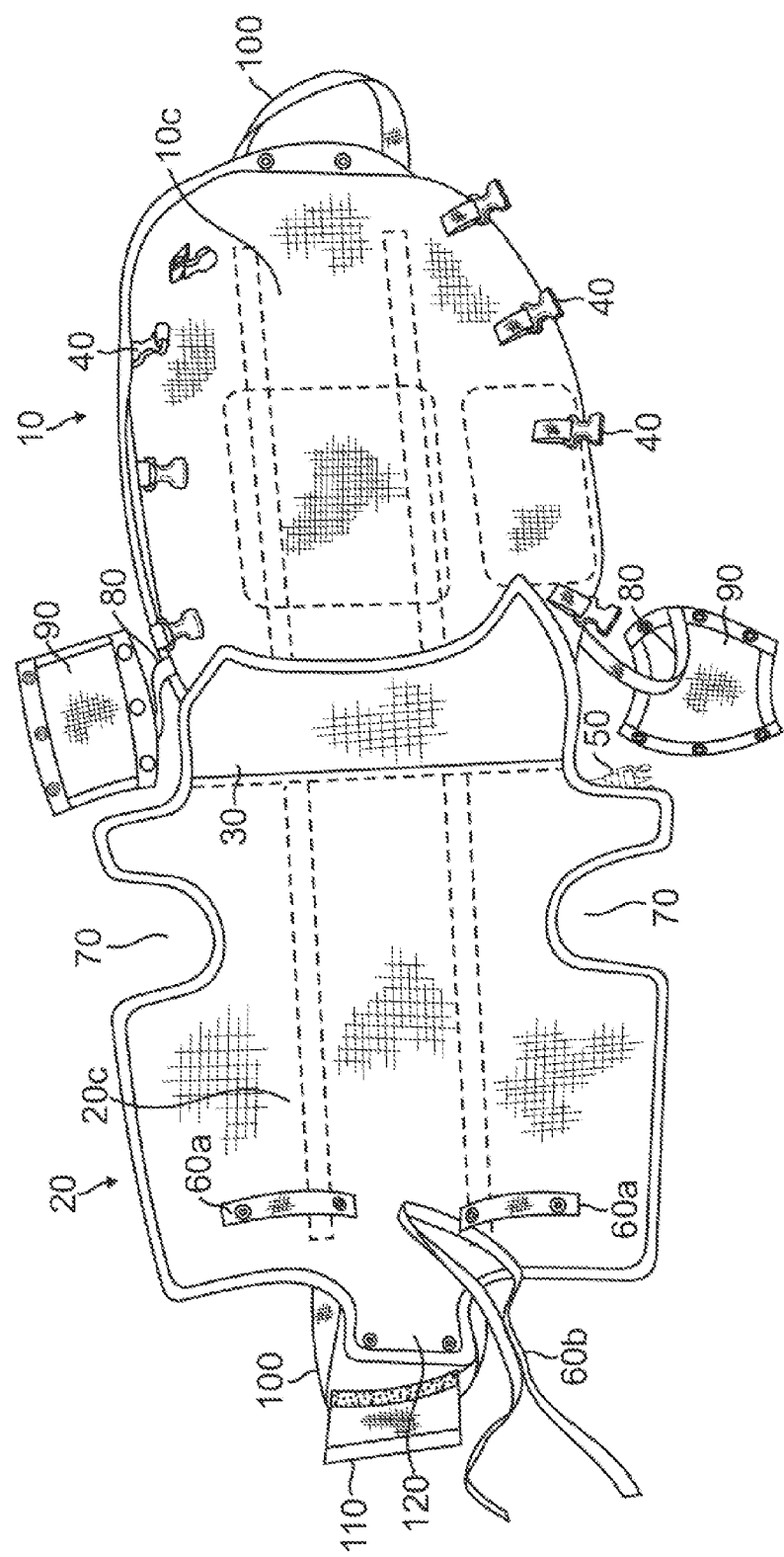
FIG. 2 shows a plan view of a parachute carrying device according to the preferred embodiment of this invention in an open position with an inner side and a business side facing up.
Figure 3:
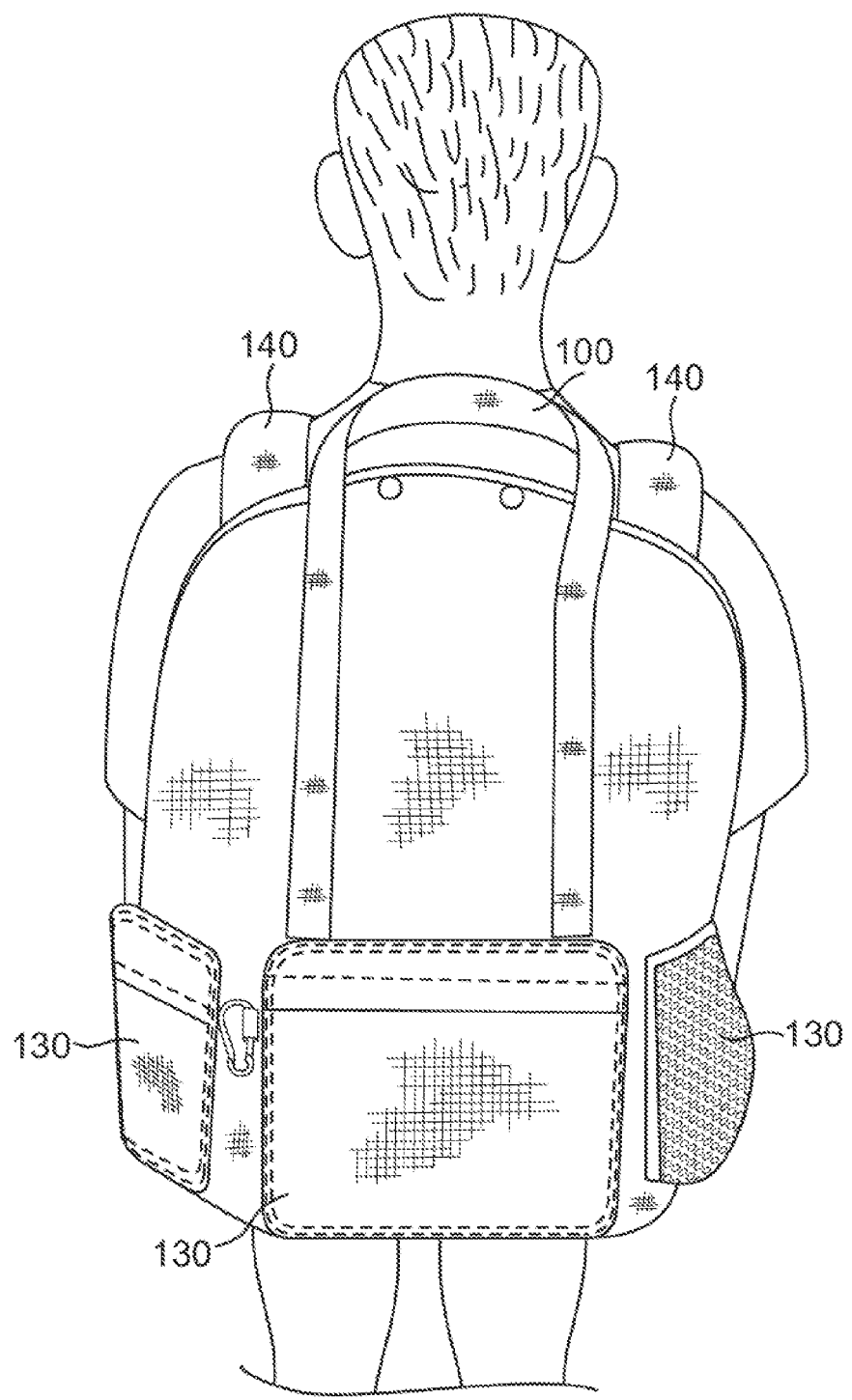
FIG. 3 shows a parachute carrying device according to the preferred embodiment of this invention in a closed position worn by a user.

This invention will be better understood with the reference to FIG. 1 through FIG. 3. The same numerals indicate the same elements in all drawing figures.

Viewing, simultaneously, FIG. 1 through FIG. 3, numeral 10 indicates a substantially U-shaped cover. U-shaped cover 10 comprises a tail end indicated by numeral 10a, a head end indicated by numeral 10b, an inner side indicated by numeral 10c and an outer side indicated by numeral 10d.

Numeral 20 indicates a substantially rectangular folding mat. Folding mat 20 comprises a proximal end indicated by numeral 20a, a distal end indicated by numeral 20b, a business side indicated by numeral 20c, a back side indicated by numeral 10d. There is also a longitudinal axis between spanning between proximal end 20a and distal end 20b.

In the preferred embodiment, U-shaped cover 10 and folding mat 20 are made from durable lightweight fabric, such as nylon.

Numeral 30 indicates a flexible strip. Flexible strip 30 connects tail end 10a to proximal end 20a.

Numeral 40 indicates a plurality of first fastening means. First fastening means 40 are disposed along the periphery of cover 10 on outer side 10d. Numeral 50 indicates a plurality of corresponding second fastening means. Second fastening means 50 are disposed along the periphery of folding mat 20 on back side 20d.

The parachute carrying device can be placed in a closed position by engaging the corresponding first fastening means 40 and second fastening means 50 as shown in FIG. 3. The parachute carrying device can be placed in an open position by disengaging the corresponding first fastening means 40 and second fastening means 40 and spreading the cover and the folding mat on a flat surface as shown in FIGS. 1 and 2. In the preferred embodiment, first fastening means 40 and second fastening means 50 are clip fasteners.

There is provided an alignment means disposed on business side 20c near distal end 20h for aligning and fixing parachute risers while packing a parachute. In the preferred embodiment, the alignment means comprises a pair of straps indicated by numeral 60a and a pair of ties indicated by numeral 60.

Straps 60a are disposed symmetrically about the longitudinal axis. Each strap 60a comprises a first end and a second end. The first end is affixed to business side 20c and comprises a female button fastener. The second end comprises a male button fastener. Straps 60a secure the parachute risers by placing straps 60a over the parachute risers and engaging the male button fastener with the female button fastener.

Ties 60b are affixed to business side 20c substantially on the longitudinal axis. Ties 60b are used for tying the parachute risers together. Either straps 60a or ties 60b can be used for aligning and fixing parachute risers while packing a parachute, depending on a user's preference.

Numeral 70 indicates a cutout. A pair of cutouts 70 are disposed symmetrically about the longitudinal axis in folding mat 20 near proximal end 20a. When the parachute carrying device is placed in the closed position encasing the packed parachute inside a parachute container between inner side 10c and business side 20c, parachute shoulder harnesses indicated by numeral 140 are pulled through cutouts 70 and placed over a user's shoulders for carriage, as shown in FIG. 3.

Numeral 80 indicates a cord. A pair of cords 80 are affixed to the periphery of cover 10. Cords 80 are disposed symmetrically about the longitudinal axis near tail end 10a.

Each cord 80 comprises a sleeve indicated by numeral 90. Sleeve 90 is affixed to the end of cord 80. Each sleeve 90 is made from a stretchy material and sized to be wrapped around an emergency handle of the parachute by engaging a plurality of corresponding male and female button fasteners disposed lengthwise on edges of sleeve 90. The emergency handles are pulled in case the main parachute does not work correctly and must be cut away and a reserve parachute must be deployed by pulling on the emergency handles. Sleeves 90 are used to cover the emergency handles in order to protect them from getting snagged or accidentally pulled while traveling.

Numeral 100 indicates a handle. A pair of handles 100 are disposed on head end 10b and distal end 20b.

Numeral 110 indicates a wrap-around handle extension. Wrap-around handle extension 110 is affixed to either one of handles 100. Wrap-around handle extension 110 is made of a flexible material and has corresponding velcro fasteners disposed lengthwise on wrap-around handle extension 110 for wrapping around and securing wrap-around handle extension 110 over handles 100.

Numeral 120 indicates a rectangular flap. Rectangular flap 120 extends from distal end 20b and has a plurality of button fasteners on its outer edge engaging with corresponding button fasteners disposed on head end 10b when the parachute carrying device is placed in the closed position.

Numeral 130 indicates a pocket. A plurality of pockets 130 are disposed on outer side 10d. Pockets 130 are used for carrying small items while traveling.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A parachute carrying device comprising:
   a substantially U-shaped cover comprising a tail end, a head end, an inner side and an outer side;
   a substantially rectangular folding mat comprising a proximal end, a distal end, a business side, a back side and a longitudinal axis between the proximal end and the distal end;
   a flexible strip connecting the tail end to the proximal end;
   a plurality of first fastening means disposed along the periphery of the cover on the outer side and a plurality of corresponding second fastening means disposed along the periphery of the folding mat on the back side, such that the parachute carrying device can be placed in a closed position by engaging the corresponding first and second fastening means and such that the parachute carrying device can be placed in an open position by disengaging the corresponding first and second fastening means and spreading the cover and the folding mat on a flat surface;
   an alignment means disposed on the business side near the distal end, the alignment means aligning and fixing parachute risers while packing a parachute by way of the folding mat securing the risers together within the parachute carrying device;
   a pair of cutouts disposed symmetrically about the longitudinal axis in the folding mat near the proximal end, such that when the parachute carrying device is placed in the closed position encasing the packed parachute inside a parachute container between the inner side and the business side, parachute shoulder harnesses are pulled through the cutouts and placed over a user's shoulders for carriage.

2. A parachute carrying device as in claim 1, wherein the alignment means comprises a pair of straps disposed symmetrically about the longitudinal axis, each strap comprising a first end and a second end, the first end affixed to the business side and comprising a female button fastener, the second end comprising a male button fastener, the straps securing the parachute risers by placing the straps over the parachute risers and engaging the male button fastener with the female button fastener.

3. A parachute carrying device as in claim 2, wherein the alignment means further comprises a pair of ties affixed to the business side substantially on the longitudinal axis, the ties tying the parachute risers together.

4. A parachute carrying device as in claim 3, further comprising a pair of cords affixed to the periphery of the cover, disposed symmetrically about the longitudinal axis near the tail end, each cord comprising a sleeve affixed to the end of the cord, each sleeve made from a stretchy material and sized to be wrapped around an emergency handle of the parachute by engaging a plurality of corresponding male and female button fasteners disposed lengthwise on edges of the sleeve.

5. A parachute carrying device as in claim 4, further comprising a pair of handles disposed on the head end and the distal end.

6. A parachute carrying device as in claim 5, further comprising a wrap-around handle extension affixed to either one of the handles, the wrap-around handle extension made of a flexible material and comprising corresponding velcro fasteners disposed lengthwise on the wrap-around handle extension for wrapping around and securing the wrap-around handle extension over the handles.

7. A parachute carrying device as in claim 6, wherein the first and second fastening means are clip fasteners.

8. A parachute carrying device as in claim 7, further comprising a rectangular flap extending from the distal end, the rectangular flap comprising a plurality of button fasteners on its outer edge engaging with corresponding button fasteners disposed on the head end when the parachute carrying device is placed in the closed position.

9. A parachute carrying device as in claim 8, further comprising a plurality of pockets disposed on the outer side.

* * * * *